Aug. 22, 1967

Y. PRIVAS 3,336,713

PREFABRICATED SANDWICH PANEL FOR THE
CONSTRUCTION OF WALLS AND PARTITIONS

Filed April 7, 1964

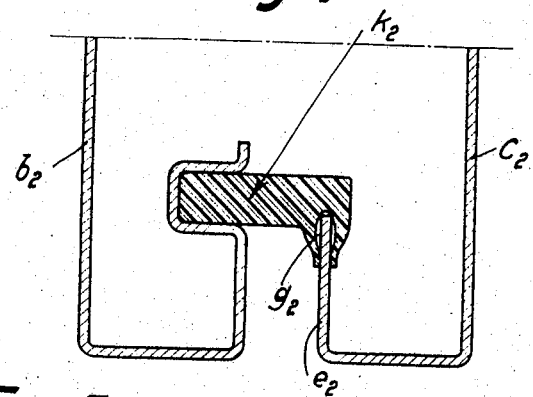
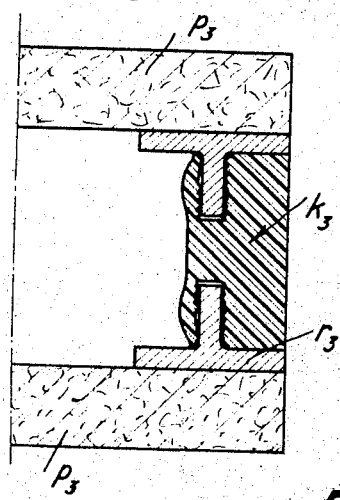
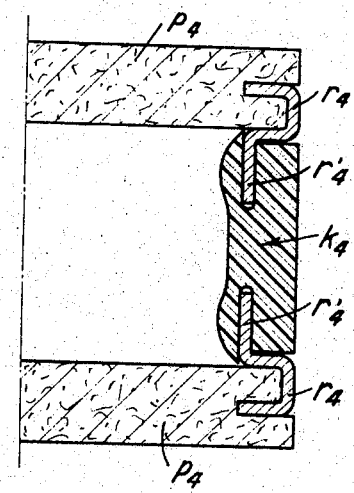
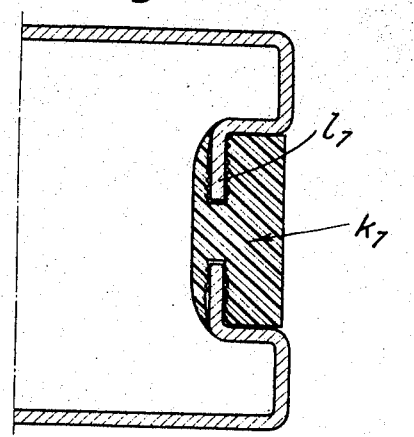

United States Patent Office 3,336,713
Patented Aug. 22, 1967

3,336,713
PREFABRICATED SANDWICH PANEL FOR THE CONSTRUCTION OF WALLS AND PARTITIONS
Yves Privas, Paris, France, assignor to Panoduz Anstalt, Vaduz, Liechtenstein
Filed Apr. 7, 1964, Ser. No. 358,029
Claims priority, application France, Apr. 12, 1963, 931,461, Patent 1,350,600; July 13, 1963, 941,395, Patent 83,944; Feb. 28, 1964, 965,541, Patent 85,412
3 Claims. (Cl. 52—403)

The present invention relates to construction panels for the erection of walls and partitions, and more especially those which have a height of one story. The invention is more specifically concerned with panels of the sandwich type, that is to say of the type which consists of an outer wall forming a closed shell composed of at least two sections assembled together and each section forming a panel facing, the said shell being filled with a mass designed to provide both sound insulation and heat insulation and preferably a mass of cellular material such as, for example, expanded polystyrene, polyurethane foam or any other material of similar type.

The present invention has for its object the novel industrial product which consists of a construction panel of the type referred to above, a characteristic feature of the said panel being provided by its end faces which are so designed as to be flexibly deformable in the direction of their thickness as well as to provide poor heat transfer from one panel facing to the other.

A perfect solution is thus found to the double problem which is created, particularly in the case of walls constructed of metal or of any material which has good heat conductivity, by the need to prevent heat from being transferred rapidly from one panel facing to the other by the wall itself and to prevent the bending of the panel as a result of the differences in expansion of opposite panel faces when the said heat transfer from one face to the other is interrupted in a suitable manner. In fact, there can easily exist a temperature difference of the order of 80° C. between an outer panel face which is exposed to the sun and the opposite face which is not subjected to the action of the sun. Differences in expansion accordingly result in a bending of the panel with a deflection at the centre which can accordingly reach several centimetres.

The expression "flexibly deformable" is understood to mean in this sense that the end wall is deformed transversely in the direction of its thickness under a sufficiently low stress so that no appreciable bending of the panel as a whole can consequently take place.

In an advantageous form of embodiment, the flexibly deformable end wall of the panel is constituted at least over a substantial portion of the thickness of the panel by a preformed and shaped strip having a transverse cross-section which is greater in height than in width and fabricated of a material which provides good heat insulation and which is sufficiently readily deformable for the purpose referred to, the said strip being placed lengthwise between the two panel sections so as to maintain the said sections at a certain distance apart and being joined thereto by engagement within the said sections, the two panel sections being joined together in the direction of the thickness of the said panel either by means of the internal insulating material or by means of the connection between the said shaped strip and the said panel sections or by means of both the said connection and the said insulating mass. Not only the double problem as hereinabove defined is thus completely and satisfactorily solved but, in addition, the leak-tightness of the panel remains total during all deformation processes to which the said flexibly deformable wall is subjected.

It should be noted that the male element of the interlocking assembly can equally well form part either of the shell or of the flexible wall element.

Another advantageous feature of a panel designed in accordance with the invention is that the lateral wall element in the form of a shaped strip is flexible transversely to its length and to its large faces or major dimension in cross section transverse of the length of the strip in order that the said element can readily be folded as required so as to follow the periphery of the panel. This expedient takes account of the fact that structural panel units are not standardized and that it would be difficult and costly for an industrial manufacturing process to provide prefabricated joints which are molded into shape for all sizes of panels. In all of the embodiments of the invention, the flexible strip includes a cross section transverse of the length of the strip in which the major dimension extends substantially perpendicularly to the main faces of the panel and a minor dimension which extends substantially perpendicularly to said major dimension and substantially parallel to said main faces of the panel.

Furthermore, it is preferable to ensure that the interlocking assembly of the lateral wall element in the form of a shaped strip with the panel sections which form outer facing elements is a force fit, the said shaped strip being accordingly provided for this purpose, for example, with inclined lips which are directed towards the central longitudinal axis thereof, to define a fluid-tight mortise-tenon relation between the strip and the shell sections.

Similarly, it is preferable in order to increase the strength of the panel and the bond between opposite shell sections to ensure that the end face of each shell section is provided with a return or flange directed towards the centre of the panel and preferably on the four sides of the said panel, thus forming a frame around a central cavity. The said flanges are accordingly gripped within the cellular mass and in this way serve to secure the two facings relatively to each other in the direction of the thickness of the panel.

A large number of alternative forms of embodiment of the panel in accordance with the invention are possible. Thus, it follows from this that each shell section or facing element can be formed of a sheet which can be either of steel or any other metal sheeting and which is cut out and folded or die-stamped, or alternatively of a single flat plate (of asbestos, cement, sheet metal, etc.), there being secured to one of the large faces of the said shell section and at the periphery thereof an added end wall such as a structural steel member (T-iron, angle-iron, channel-iron, etc.). Similarly, the insulating cellular mass which is contained in the interior of the outer wall or shell of the panel can be a foam which is injected in situ in the manner which is already known or alternatively, the interior of the said shell can be filled, as is also known per se, with a cellular mass which has previously been shaped, for example, by cutting-out, said mass consisting of expanded polystyrene, plastic foam and the like which is fitted into and left free inside the shell or else bonded to this latter by means of a suitable adhesive.

Moreover, the jointing or interlocking of the flexibly deformable end-wall element and adjacent shell sections can be carried into effect in a number of very different ways. The said end-wall element can be provided, for example, with a longitudinal channel in which is inserted the edge of a wall which forms part of the adjacent shell section and which forms part of the end face of the panel; said wall can be either perpendicular or parallel to the outer faces of the panel and can be formed, when each shell section is provided with a flange around the entire periphery of the central cavity, by a portion of said flange which is bent outwards at right angles to the panel faces. Alternatively, it is the adjacent shell section which is provided with a channel or groove in which the flexibly deformable end-wall element is engaged edgewise. The two arrangements can also be employed in combination with each other in a same panel.

The presence of the said flexibly deformable end-wall element offers an additional advantage in the case in which the insulating mass with which the interior of the panel is packed consists of a foam injected in situ. In this case, in accordance with an additional feature of the invention, the engageable element which forms part of one of the shell sections is cut away over a certain length at least over that portion thereof which is located opposite a section of the said flexibly deformable end-wall element and transversely to the length of this latter in such a manner that at least one of the extremities of said end-wall element is capable of being turned back inwardly by bending and thus providing a passageway for a nozzle for injecting into the interior of the panel the material which is intended to swell so as to form the insulating foam. The injection operation is thus facilitated and it is no longer necessary to seal off the injection orifice inasmuch as the sealing is effected automatically as a result of the return of the deflected end of the said end-wall element to the normal position thereof, both by virtue of its natural elasticity and the pressure of the foam, when the injection nozzle is withdrawn.

A number of embodiments of panel units as designed in accordance with the invention and as illustrated in the accompanying drawings will now be described hereinafter, said embodiments being given solely by way of example without any limitation being implied.

Figure 12:
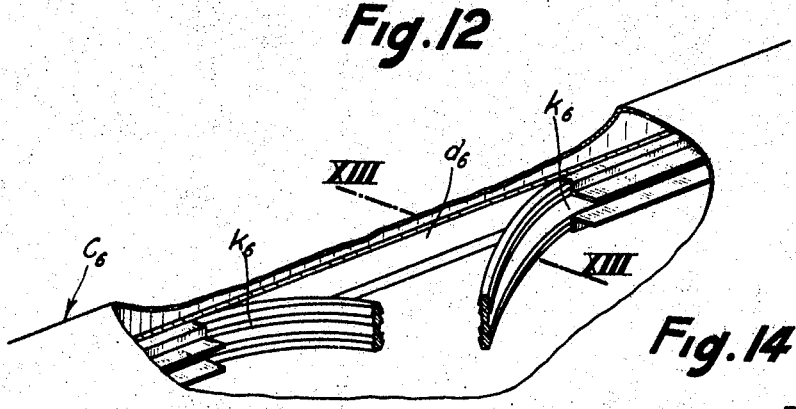
Figure 13:
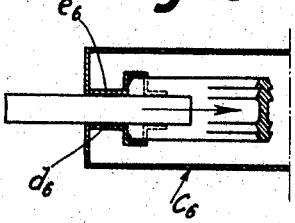
Figure 14:
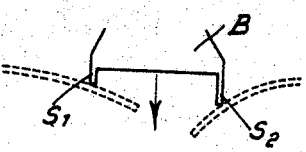

FIGS. 4 to 11 each represent the right-hand section of a different form of embodiment of panel and of the flexibly deformable wall element;

FIG. 12 is a view in perspective with a portion broken away of that portion of a panel which is adapted to permit the insertion of a nozzle for the injection of an insulating plastic foam;

FIG. 13 is a transverse cross-section of the same portion of panel taken along the plane which is designated by 13—13 in FIG. 12;

FIG. 14 is a corresponding diagrammatic sectional view showing the injection nozzle in position and the lips of the flexibly deformable end-wall element which are thrust back towards the interior.

Figure 1:
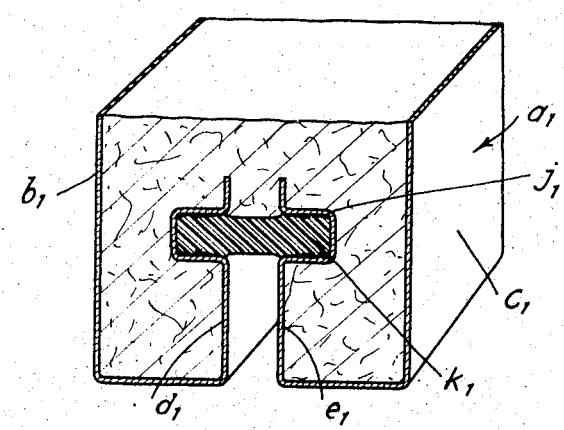
FIG. 1 is a view in transverse cross-section of a portion of panel.

In the form of embodiment which is illustrated in FIG. 1, the panel which is generally designated by the reference $a_1$ consists of two elements $b_1$ and $c_1$, each having the shape of a rectangular parallelepiped, one large or main face of which is full whilst the opposite large face is open in such manner as to form a peripheral flange or lip $d_1$, $e_1$ which encloses a central cavity. These two elements $b_1$ and $c_1$ constitute two sections of the outer shell of the panel and are placed side by side with their open faces in oppositely facing relation but not in contact, a space of a few millimeters which is preferably greater than 5 mm. being left between the said faces. A channel or groove $i_1$, $j_1$ which penetrates into the interior of the caisson and which is open at the exterior is formed in each flange $d_1$, $e_1$ around the entire periphery of the central cavity. The said channels are in oppositely facing relation and the end wall of the panel $a_1$ which comprises the end faces of the elements $b_1$ and $c_1$ or shell sections is completed by a flexibly deformable wall element $k_1$ having an elongated transverse cross-section, the edge of which is fitted under slight pressure within said channels, and extends lengthwise of the respective side faces of the panel in mortise-tenon relation. The said flexibly deformable wall element is formed of heat-insulating material which can advantageously be a plastic material such as neoprene or polyvinyl chloride, for example. In addition, the said wall element can be molded in one piece but is preferably formed of a flexible strip which is shaped transversely to its length, and the juxtaposed ends of which are cut at an oblique angle and accordingly overlap.

The space between the two boxes or caissons $b_1$ and $c_1$ is thus sealed off in a leak-tight manner by the said wall element $k_1$ whilst the said two caissons $b_1$ and $c_1$ are free to expand independently of each other and any heat transfer from one caisson to the other through the end wall is accordingly prevented.

Figure 2:
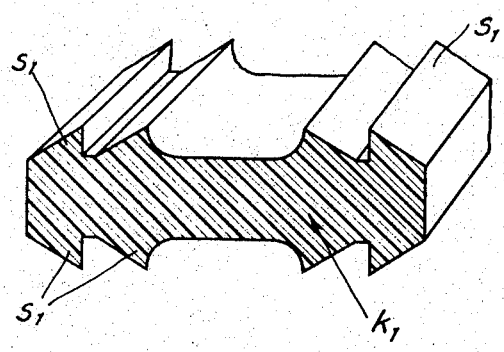
FIGS. 2 and 3 are sectional views on a larger scale of the right-hand section of two forms of embodiment of the flexibly deformable end wall.

As a preferable feature, and as is brought out more clearly from FIG. 2, the engaged portions of the flexibly deformable wall element $k_1$ are provided with longitudinal lips $s_1$ which are directed at an oblique angle from the tips to the central portion in such a manner as to offer no resistance to the penetration of the said element in mortise-tenon relation within the channels while nevertheless setting up elastic resistance which prevents the said element from escaping, and at the same time improving leak-tightness.

It is the combined assembly of the three parts $b_1$, $c_1$ and $k_1$ referred to above which constitutes the outer wall or shell of the panel $a_1$. The interior of the panel is filled with a cellular mass which is heat-insulating and sound-insulating, and preferably with a plastic foam such as a phenolic resin foam, a urea-formaldehyde foam, a polyvinyl chloride foam, a polyurethane foam and the like, or alternatively with expanded polyvinyl and so forth. The said cellular mass can be a foam which is expanded in situ in a manner which is known per se after assembly of the aforesaid three parts which constitute the outer shell, or else it can be a pre-formed mass which is placed in position prior to the assembly of said parts. In this latter case, the cellular mass can either be secured or not, for example by glueing, to the walls of the caissons $b_1$ and $c_1$.

In this form of embodiment, the said caissons $b_1$ and $c_1$ are formed of sheet metal which is either of steel or aluminum and enamelled or not, and are advantageously of plasticized sheet steel on which plastic material having a base of half-hard polyvinyl chloride is applied on the sheet by rolling.

Figure 3:
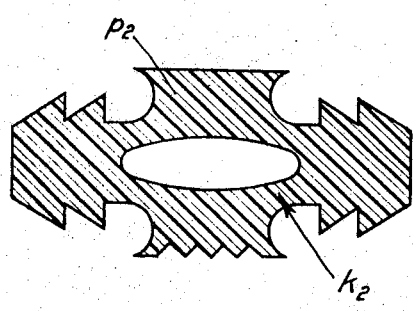

In FIG. 3, the flexibly deformable wall element $k_2$ which is illustrated differs from the element of FIG. 2 in that it is hollowed-out in the central portion thereof which is provided with two oppositely directed projecting portions $p_2$ in the form of longitudinal strips which are interposed between the opposite faces of the caissons $b_1$ and $c_1$ in mortise-tenon relation for the purpose of further increasing the leak-tightness of the assembly.

In the alternative form of embodiment which is illustrated in FIG. 4, the caisson $b_2$ is identical with the caisson $b_1$ of FIG. 1 but the caisson $c_2$ differs from the caisson $c_1$ in that the flange $e_2$ which is parallel to the front faces of the panel does not have a channel of similar configuration to the channel $j_1$ of the caisson $c_1$ and in that the edge of the flange $e_2$ engages in mortise-tenon relation within a channel $g_2$ which is formed in the flexibly deformable wall element $k_2$, passes out on the outer face thereof and surrounds the said element. The shape which is thus given to the caisson $c_2$ has the advantage of reducing the area of sheeting which is necessary for the construction of the said caisson.

The interior of the panel is the same as in the case of FIG. 1.

In the panel which is illustrated in FIG. 5, provision is not made for any caisson. The outer faces of the panel consist of two full plates $p_3$ of any material which may be desired such as asbestos cement, natural marble or reconstituted marble, granite, glass, and so forth. The sole of a structural member $r_3$ which is shown in the figure as a T-shaped member is secured either by glueing or otherwise at the periphery of one of the faces of each plate $p_3$. The faces of the outer plates $p_3$ which are provided with a peripheral structural member are disposed in oppositely facing relation and the flexibly deformable wall element $k_3$ is interposed between the structural members. The said wall element externally fills the space which is formed between the structural members and is brought flush with the ends of the facing plates $p_3$. The webs of the structural members $r_3$ are adapted to fit in mortise-tenon relation within oppositely facing grooves which are formed in the said flexibly deformable wall element.

The interior of the panel remains the same as in the previous examples.

Structural shapes or members other than those which have been illustrated could be employed such as simple angle-irons or alternatively channel-irons, the bases of which are secured to the facing plates; in this latter case, the flexible wall element could be made to fit the recess of the channel-iron or U while covering the flanges thereof, the said flanges being in that case fitted in two parallel grooves formed in said flexibly deformable wall element.

FIG. 6 represents an alternative form of embodiment of the panel of the previous example. In this case, instead of a structural member which is secured to a facing plate, use is made of a metallic frame $r_4$ which grips a facing plate $p_4$; said frame in this case consists of a U-shaped portion, in the recessed portion of which is fitted a portion of the thickness of the facing plate whilst the outer flange of the U is fitted in a groove formed in the end face or edge of said facing plate $p_4$ completely around the periphery thereof. The other arm of the U is provided at its extremity with a flange $r'_4$ which performs the same function as the webs of the T-irons $r_3$ in the form of embodiment of FIG. 5 and which, as in the case of these latter, is inserted in a peripheral groove of the sealing joint $k_4$, in mortise-tenon relation.

The alternative form of embodiment which is illustrated in FIG. 7 is comparable with the panel which is illustrated in FIG. 1 as well as with those which are shown in FIGS. 5 and 6. The interlocking assembly of the flexibly deformable wall element $k_7$ with the other constituent portions of the outer panel-wall is carried into effect, as shown in FIGS. 5 and 6, by inserting in mortise-tenon relation within grooves of the flexibly deformable element $k_7$ a wall $l_7$ which is perpendicular to the outer faces of the panel and which forms parts of said other constituent portions of the outer panel-wall. But in this case the said walls $l_7$ are no longer constituted by added structural shapes or by a frame but simply by folding back the outer wall itself which is of sheet metal.

Figure 8:
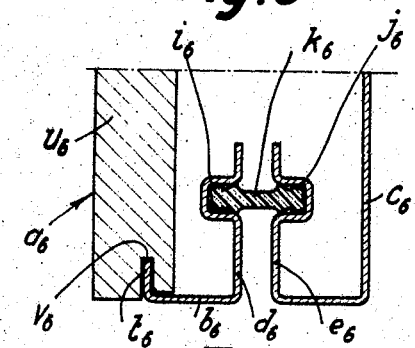

In FIG. 8, the panel is constituted as in FIG. 1 and comprises caissons $b_6$ and $c_6$, each caisson having the shape of a rectangular parallelepiped and formed of folded sheet metal. One of the large faces of the caisson $c_6$ is full whilst the opposite face thereof is open in the central portion thereof while forming a peripheral flange $e_6$ which is folded back so as to form a kind of trough or channel $j_6$ which projects into the interior of the caisson and the hollow portion of which is directed outwards. One of the large faces of the other caisson $b_6$ comprises an open portion as in the case of the caisson $c_6$ and consequently has a peripheral flange $d_6$ in which is formed a groove $i_6$.

As distinct from the panel of FIG. 1, the other large face of the metallic caisson $b_6$ is not full, inasmuch as the entire central portion of said face is open and the metallic wall is limited to a flange $t_6$. The open portion of said large face of the caisson $b_6$ is taken up by an added plate $u_6$ which can be either of marble, glass, etc. There is formed around the entire periphery of the edge of said plate a groove $v_6$ in which is engaged the flange $t_6$ which is secured thereto in leak-tight manner by means of a synthetic sealing adhesive having a base of plastic material which is advantageously of the type known as Araldite.

The flexibly deformable wall element $k_6$ is interposed between the two caissons $b_6$ and $c_6$ which are placed opposite each other and the open walls of which are in opposite and parallel relation and at a distance of a few millimeters from each other. The sides of the said flexibly deformable wall element are fitted in mortise-tenon relation within the grooves $i_6$ and $j_6$ and the central region thereof alone constitutes a portion of the end panel-wall.

Figure 9:
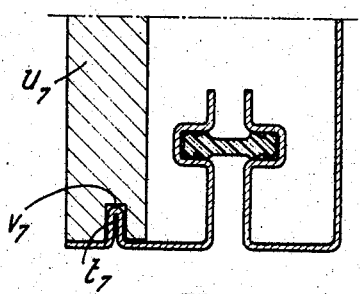
Figure 10:
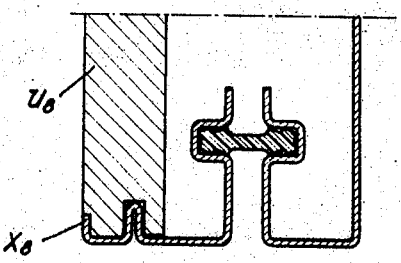
Figure 11:
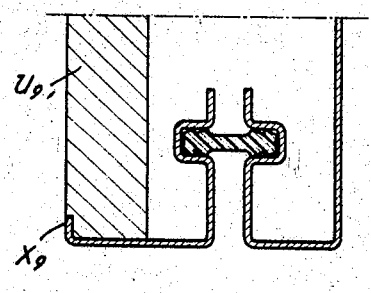

FIGS. 9 to 11 represent alternative forms of embodiment of the assembly of the added plate which forms the caisson base-wall and of the metallic portion of the said caisson.

In the alternative form which is illustrated in FIG. 9, the metallic portion of the caisson entirely covers the edge of the added plate $u_7$ instead of leaving it partially uncovered as in FIG. 8. The flange $t_7$ which serves to assemble together the metallic portion of the caisson and the added plate by penetration of the said flange in a groove $v_7$ of this latter is in this case formed by folding back the end face of the metallic portion into a U-shape at an intermediate point of its length.

In the alternative form which is illustrated in FIG. 10, not only the end face of the metallic portion covers the edge or end face of the added plate but in addition a flange $x_8$ of the said metallic portion is applied against the outer face of the added plate $u_8$ preferably inside a rabbet formed around the entire periphery of the said face, thus forming a visible but non-projecting frame around the said outer face while at the same time affording protection for the outer corner of the added plate.

In FIG. 11, the said jointing and facing flange which is designated in this example by the reference $x_9$ is provided alone without engagement of the metallic portion inside a groove of the added plate $u_9$ which is in this case held in position only by means of the foam.

The provision of a space of a few millimeters between the opposite faces of the two caissons makes it possible to simplify the operation which consists in injecting the product for forming the foam. Accordingly, the flexibly deformable wall element $k_6$ (as shown in FIG. 12) is cut at an oblique angle in the transverse central plane of the panel, that is to say the plane which is perpendicular to the longest dimension of the said panel; moreover the wall against which the inner face of the said element $k_6$ is applied and which is formed by the inner sides of the grooves in which the said element is fitted is cut away over a certain length on each side of the cut which is thus made in the element $k_6$. The two ends of the element can thus be bent back into the interior of the panel as shown in FIG. 12 under the thrust of a flat injection nozzle B (as shown in FIGS. 13 and 14) which is inserted between the flanges $c_6$ and $d_6$ of the opposite faces of the two caissons. As can be seen from FIG. 14, the nozzle B is provided on the sides of its orifice and ahead of this latter with two projections $S_1$, $S_2$ of unequal length for the purpose of thrusting one of the extremities of the element $k_6$ to a greater distance than the other extremity into the interior of the panel. The material injected can thus pass easily through the space which is thus provided between the said two extremities or lips of the element $k_6$. As soon as the nozzle is withdrawn, these lips swing back of their own accord as a result of elasticity and come back into contact with the outer bearing face of their housing. The bevelled extremities of the lips thus overlap and bear against each other. The flexibly deformable wall element $k_6$ is held applied against these outer bearing faces by the thrust of the foam which is developed in the interior.

All the other panel structures which have been described in the foregoing can also be designed in a similar manner for the injection of foam.

In the case of panels provided with flanges such as the flange $d_1$, $e_1$ and in the case of injected foam, the pressure exerted by the said foam on the said flanges has a tendency to bring the said flanges together and also to prevent the panels from having any tendency to open or gape at their periphery under the pressure of the foam.

What I claim is:

1. A prefabricated sandwich panel of generally rectangular shape including two main wall faces parallel to each other and four edge faces substantially perpendicular to said main wall faces, said panel comprising two oppositely-arranged box-like shell sections, each of said shell sections including a main face defining one of the main faces of said panel and lateral side portions respectively facing like lateral side portions of the other shell section, each of the lateral side portions of each shell section including a first edge portion extending substantially perpendicularly to its respective main face and a second edge portion extending inwardly from said first edge portion in a direction generally parallel to its corresponding main face, the panel thickness perpendicularly to said main wall faces being greater than the sum of the thicknesses of both said shell sections so that a gap is provided between said two shell sections in the direction perpendicular to said main wall faces of said panel along all of said four edge faces, said gap providing a straight throughway from the exterior into the interior of the panel, sound and heat insulating means filling the interior of said panel, said gap being bounded by the respective second edge portions of the lateral side portions of said shell sections, each of said second edge portions being shaped to form a channel-like mortise facing and in alignment with a like mortise of the contiguous second edge portion of the other shell section, the depth of each mortise being perpendicular to said main wall faces, a preformed flexible strip of thermal insulating character, said flexible strip in cross section transverse of its length including a major and a minor dimension, said major dimension of said strip extending perpendicularly to said main wall faces, said minor dimension of said strip extending perpendicular to said major dimension and substantially parallel to said main wall faces, said flexible strip engaging the facing mortises formed in said second edge portions of said oppositely-arranged shell sections in fluid-tight mortise-tenon relation therewith at opposite extremes of said major dimension of said strip whereby said strip is free and unconfined for an intermediate portion of said major dimension thereof and in bridging relation to said gap, said flexible strip extending along the entire length of said four edge faces whereby to fluid-tightly close said gap along the entire periphery of said panel and together with said lateral side portions of said two shell sections to define the respective edge faces of said panel, and whereby to accommodate relative movement of said two box-like shell sections with respect to each other due to dimensional changes caused by changing environmental conditions.

2. A construction panel as defined in claim 1, wherein said strip is provided with a transverse cut, and portions of the shell sections defining the mortises are cut away over a length in register with said transverse cut in the strip, whereby to permit the strip to be momentarily bent inwardly to provide a passageway for a nozzle for injecting into the panel an insulating material.

3. A construction panel as in claim 1, wherein said strip is a one-piece strip flexible both transversely to its length and to its major transverse dimension and is around all said four edge faces.

References Cited

UNITED STATES PATENTS

| | | | |
|---|---|---|---|
| 2,279,050 | 4/1942 | Lenning | 52—619 |
| 2,622,710 | 12/1952 | Haas | 52—404 X |
| 2,835,360 | 5/1958 | Bernardoni et al. | 52—403 |
| 2,912,725 | 11/1959 | Ries | 52—619 X |
| 3,014,560 | 12/1961 | Krauss et al. | 52—396 X |
| 3,037,591 | 6/1962 | Pulling et al. | 52—397 |
| 3,093,217 | 6/1963 | Doede | 52—403 X |
| 3,101,820 | 8/1963 | Snyder | 52—397 X |
| 3,153,817 | 10/1964 | Pease | 52—619 |
| 3,156,332 | 11/1964 | Cameron | 52—404 |
| 3,168,089 | 2/1965 | Larkin | 52—304 X |

FOREIGN PATENTS

| | | |
|---|---|---|
| 219,032 | 12/1958 | Australia. |
| 581,207 | 10/1946 | Great Britain. |
| 639,955 | 7/1950 | Great Britain. |
| 842,939 | 7/1960 | Great Britain. |
| 346,008 | 6/1960 | Switzerland. |

FRANK L. ABBOTT, *Primary Examiner.*

RICHARD W. COOKE, JR., *Examiner.*

M. O. WARNECKE, *Assistant Examiner.*